Jan. 16, 1962 K. W. FLINT 3,017,138
APPARATUS AND METHOD FOR MOVING LOADS WITH
COMBINATION HELICOPTER AND BALLOON
Filed March 5, 1958 4 Sheets-Sheet 1
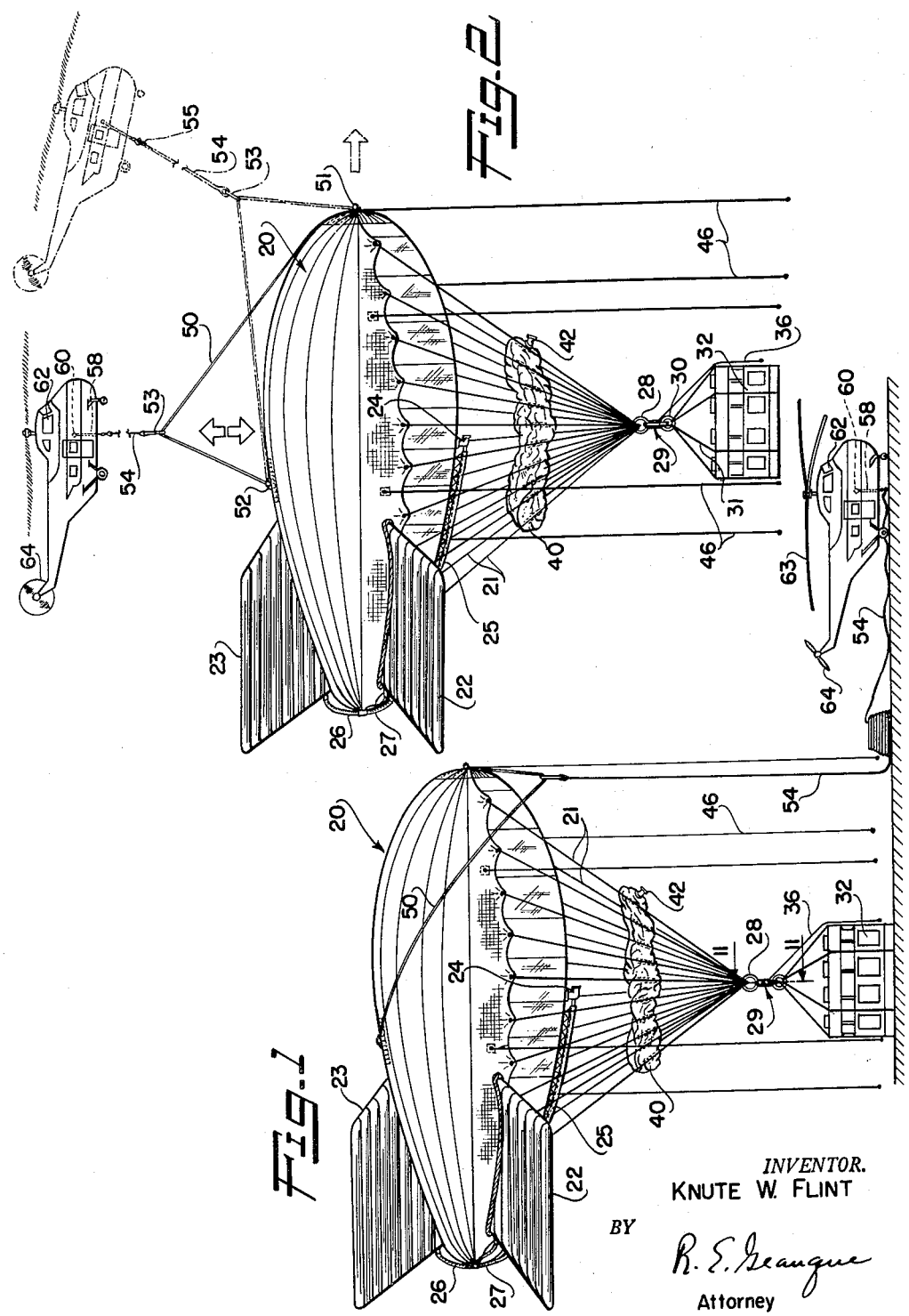
INVENTOR.
KNUTE W. FLINT
BY
R. E. Geauque
Attorney

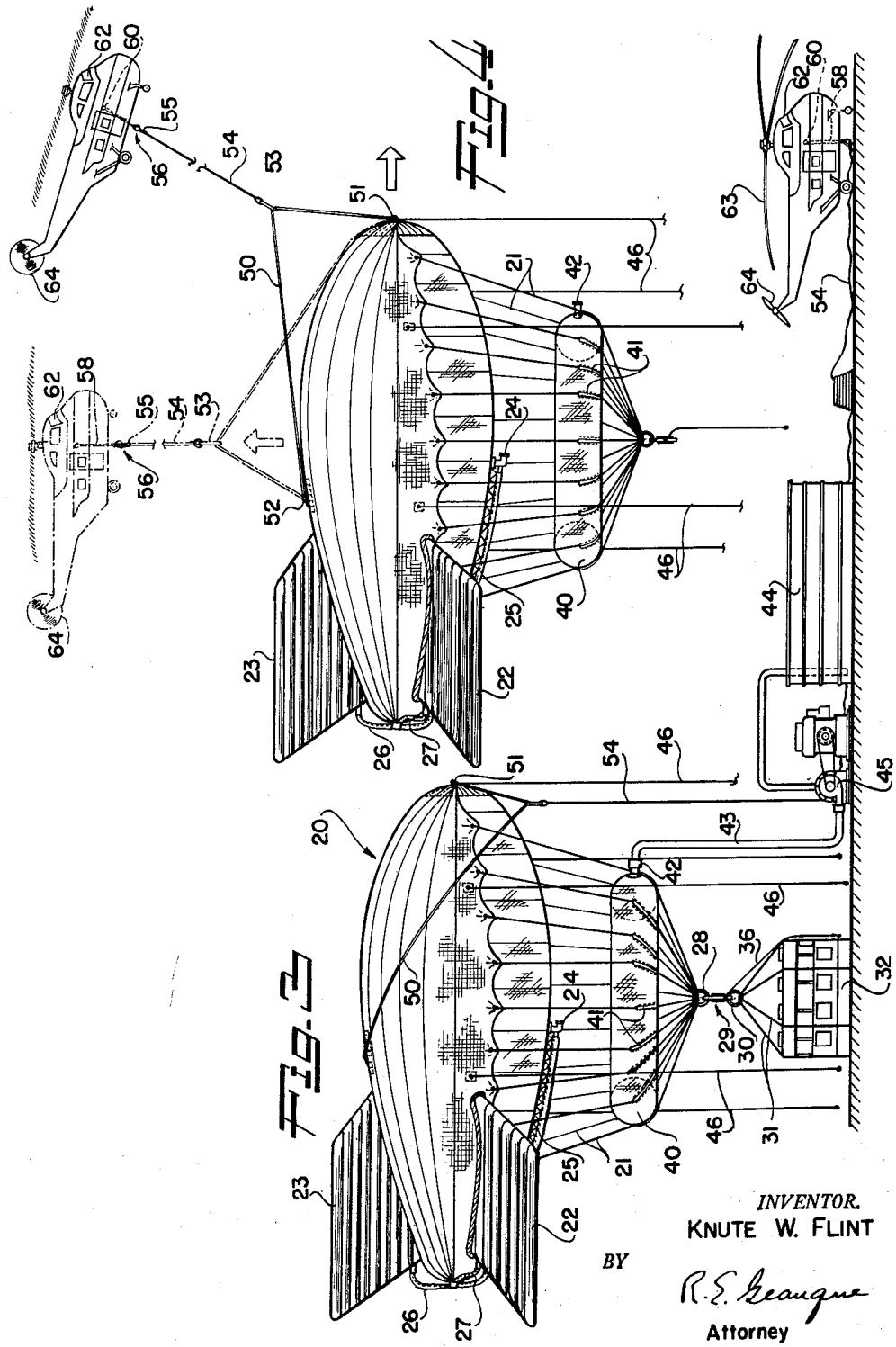
Jan. 16, 1962 K. W. FLINT 3,017,138
APPARATUS AND METHOD FOR MOVING LOADS WITH
COMBINATION HELICOPTER AND BALLOON
Filed March 5, 1958 4 Sheets-Sheet 2
INVENTOR.
KNUTE W. FLINT
BY
R. E. Geauque
Attorney Jan. 16, 1962        K. W. FLINT        3,017,138
APPARATUS AND METHOD FOR MOVING LOADS WITH
COMBINATION HELICOPTER AND BALLOON
Filed March 5, 1958        4 Sheets-Sheet 3
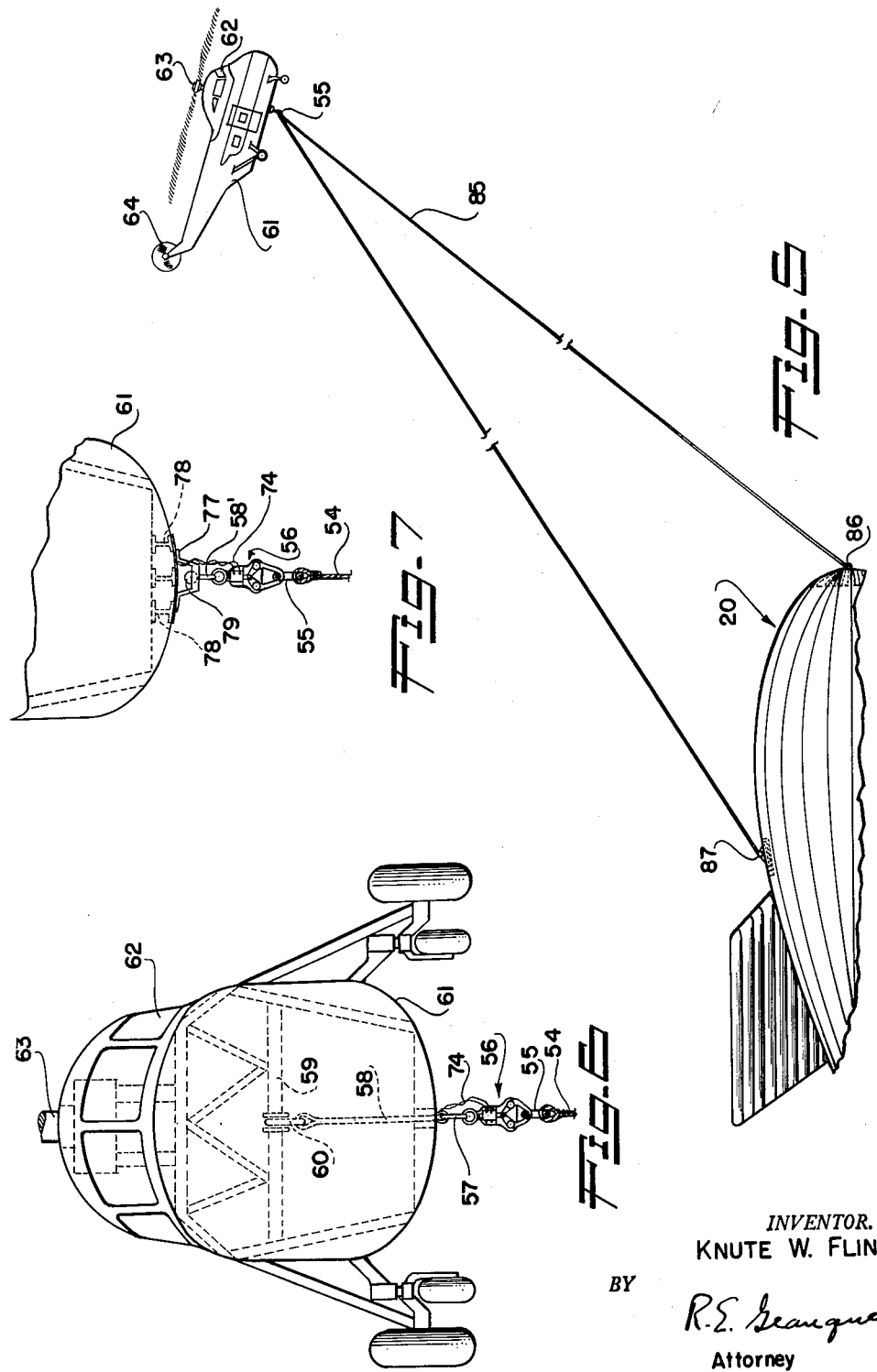
INVENTOR.
KNUTE W. FLINT
BY
Attorney

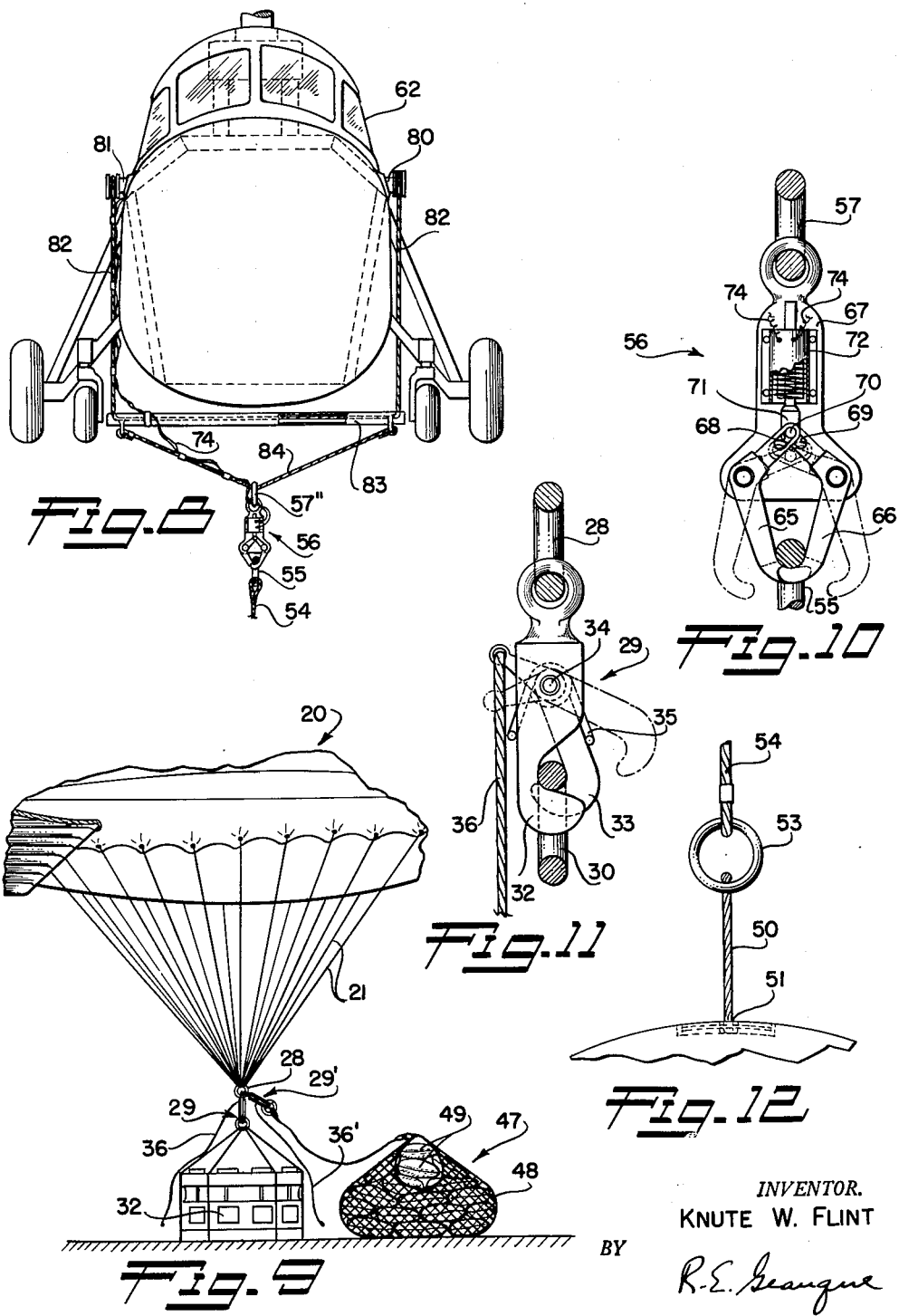

United States Patent Office 3,017,138
Patented Jan. 16, 1962

3,017,138
APPARATUS AND METHOD FOR MOVING LOADS WITH COMBINATION HELICOPTER AND BALLOON
Knute W. Flint, Los Angeles, Calif., assignor to World Wide Helicopters, Inc., Van Nuys, Calif., a corporation of California
Filed Mar. 5, 1958, Ser. No. 719,230
2 Claims. (Cl. 244—3)

The present invention relates to an apparatus and method for moving loads with a combination helicopter and balloon, and more particularly to an apparatus and method of transporting heavy loads attached to a balloon wherein the additional lift required to move the load is supplied by a helicopter.

Various systems have been suggested wherein a balloon in stable equilibrium with a load can be pulled or towed by aircraft and also, it is quite common to lift a load directly by a helicopter through the expediency of a sling attached to the helicopter. In addition, balloons of greater lift than required to move a load have been controlled in their movement by cable means exerting a downward pull on the balloon.

The present invention is directed to the movement of a load which is greater than the lifting force of the balloon attached thereto and the balloon is transported by connecting a helicopter to the balloon in order to supply the additional lift required to move the load. The invention also provides means for replacing the load with a ballast weight so as to maintain the balloon in an overloaded condition after the load is removed. One such device for providing a ballast weight comprises a flexible bag carried by the shroud lines of the balloon and the bag can be filled with a sufficient weight of liquid to replace the load prior to detachment of the load. Also, standby weights can be utilized to replace the load. The tow line for the balloon can be connected to the nose of the balloon and to the top of the balloon, and the connection of the helicopter to the tow line can comprise a slidable connection so that the helicopter can move laterally and transversely of the balloon during the towing operation. With the helicopter positioned directly above the balloon, the lift of the helicopter plus the lift of the balloon will be sufficient to move the load upwardly whereas the lift of the balloon alone is not sufficient to lift the load. With the helicopter positioned above and ahead of the balloon, the helicopter can supply both a lifting force sufficient to suspend the load and a towing force to the balloon sufficient to move the load. For the safety of the pilot, the connection between the helicopter and balloon contains a quick release mechanism to quickly detach the helicopter from the balloon in case of emergency.

It is therefore an object of the present invention to provide a method and apparatus for moving loads with the combined lift of a balloon and a helicopter.

Another object of the invention is to provide a method of transporting a load by attaching the load to a balloon of insufficient lift to move the load and supplying the necessary additional lift and towing force for transporting the load by attaching a helicopter to the balloon.

A further object of the invention is to provide an apparatus for attaching a balloon to a load of greater weight than the lift of the balloon and for connecting the balloon with a helicopter in order to permit the helicopter to supply additional lift to raise the load and a towing force to transport the load.

Another object of the invention is to provide an apparatus and method for applying a ballast weight to a balloon prior to removal of the load carried by the balloon.

Another object of the invention is to provide an apparatus and method for towing a balloon by connecting a helicopter to the balloon in such a manner that the helicopter can move relative to the balloon.

These and other objects of the invention not specifically set forth above will become readily apparent from the accompanying description and drawings, in which—

FIGURE 1 is a side elevational view of the balloon and helicopter combination with the load attached to the balloon and ready for movement by the helicopter;

FIGURE 2 is a side elevational view of the helicopter and balloon combination with the helicopter shown in lifting position and in towing position;

FIGURE 3 is a side elevational view of the balloon and helicopter combination after the load has been set down and ballast weight in excess of the lift of the balloon has been added to hold the balloon;

FIGURE 4 is a side elevational view of the helicopter and balloon combination illustrating the movement of the balloon by the helicopter when the load has been replaced by the ballast weight;

FIGURE 5 is a side elevational view of a modified form of tow line;

FIGURE 6 is an end elevational view of the helicopter showing the tow rod universally connected to the helicopter frame;

FIGURE 7 is an end elevational view of a modified form of tow rod connected to the reinforced bottom of the fuselage of the helicopter;

FIGURE 8 is a side elevational view of another modification of towing means secured to the helicopter;

FIGURE 9 is a side elevational view of an auxiliary ballast weight connected to the balloon;

FIGURE 10 is an enlarged elevational view, partly in section, showing the quick release mechanism for detaching the helicopter from the tow line;

FIGURE 11 is an enlarged elevational view of the release mechanism for releasing the load from the helicopter; and FIGURE 12 is an enlarged view showing the manner in which the tow ring coacts with the tow line.

Referring to the embodiment of the invention chosen for illustration, a dirigible shaped balloon 20 of well known construction is provided with a plurality of shroud lines 21 secured to the balloon along its length and slightly below the central horizontal plane. The balloon is supplied with a pair of inflatable tail surfaces 22 and 23 to provide stability for the balloon. Both the balloon and the tail surfaces can be filled with any suitable light gas, such as hydrogen, by connecting a source of the gas to inlet pipe 24 leading to the balloon. A passage 25 connects inlet pipe 24 with the tail surfaces through branch conduits 26 and 27. After the balloon is filled with the selected amount of gas, it will have a predetermined amount of lift.

All of the shroud lines 21 are secured to a single ring 28 located below the balloon and a release mechanism 29 connects ring 28 with a ring 30 to which is attached a plurality of sling lines 31 for supporting the load 32. The sling lines 31 can be placed around the load in any suitable manner to carry the load and it is understood that any shape load can be thus secured to the balloon. Referring to FIGURE 11, the release mechanism 29 comprises a pair of hooks 32 and 33 which overlap when in closed position to hold ring 30. The hook 33 is pivotally mounted on hook 32 by pin 34 and spring 35 is connected between the two hooks to hold hook 33 in closed position. A pull cord 36 is attached to one end of hook 33 so that a force applied to the cord will open the release mechanism and release ring 30 and the load 32.

A flexible bag 40 is located within the space defined by the shroud lines 21 and has a plurality of outside tubing portion 41 for slidably receiving each one of the shroud lines 21. The bag 40 is illustrated in its deflated condition in FIGURES 1 and 2 and in its inflated condition in FIGURES 3 and 4. When deflated, the bag adds very little ballast weight to the balloon so that substantially all of the lift force of the balloon acts on the weight 32. The bag 40 has an exterior passage 42 which can be connected with a source of liquid in order to fill the bag and supply a ballast weight for the balloon. In FIGURE 3, the connection 42 is attached to a passage 43, which is supplied with a liquid drawn from tank 44 by pump 45. As will later be described, the amount of liquid supplied to the bag 40 can be controlled so that the ballast weight of liquid will equal the weight of load 32. A number of mooring lines 46 are also attached to the balloon so that the balloon can be maneuvered by the ground crew during the time when a load is attached to or removed from the balloon. Referring to FIGURE 9, the flexible bag can be replaced with a standby ballast device 47 which can comprise a net 48 filled with sand bags 49 so that the ballast weight can be varied. The net 48 is connected with ring 28 by a release mechanism 29', identical with release mechanism 29 for the load, and is operated by pull cord 36'.

A tow line 50 is secured at one end 51 to the nose of the balloon and at the other end 52 to the upper surface of the balloon slightly aft of the midpoint of the balloon surface. The tow line 50 is of greater length than the length of the balloon surface between its two tie points, so that the tow line can move away from the balloon surface. A ring 53 is slidable along the tow line 50 and is connected to one end of a tie line 54. A ring 55 is connected with the opoposite end of line 54 and is secured by a quick release mechanism 56 which is carried by a ring 57 attached to a tow bar 58. As illustrated in FIGURE 6, the tow bar is universally connected to an engine support member 59 of the helicopter by ring 60 so that the lower end of the bar can move both fore and aft and laterally and a sufficient opening is provided in the bottom of the helicopter to permit such movement. Since the ring 60 for supporting the tow bar 58 is located near the center of lift of the helicopter, the towing force on the balloon exerted through tie line 54 will not produce dangerous tilting torque on the helicopter. In FIGURE 12, the manner in which the ring 53 coacts with tow line 50 is illustrated. The illustrated helicopter has a fuselage 61, a cockpit 62, a single rotor 63 and a tail boom 64. It is apparent that any helicopter can be utilized which develops the required lifting and towing force.

The construction of the quick release mechanism 56 is illustrated in FIGURE 10. The mechanism comprises a pair of hooks 65 and 66 which are pivotally mounted on base plate 67 and which receive the ring 55 when in the closed position. The ends of hooks 65 and 66 contain overlapping slots 68 and 69, both of which receive a pin 70 connected to armature 71 of a solenoid 72. The solenoid is mounted on base 67 and is connected with two electrical lines 74 leading to the cockpit of the helicopter so that the solenoid can be actuated by the pilot to move the pin 70 and the hooks 65 and 66 outwardly, into the release position shown by dotted lines. The quick release mechanism 56 provides a means for the pilot to quickly uncouple the helicopter from the balloon in the event dangerous flight conditions are encountered.

It is understood that the tie line 54 can be secured in any suitable manner to the helicopter. For instance, as illustrated in FIGURE 7, the helicopter can carry a base plate 77, which is rigidly secured to reinforced structural members 78 at the bottom of the fuselage. The plate 77 universally supports a ball 79 on the end of a tow bar 58' which carries a ring to which the quick release mechanism 56 is attached. This universal support of the quick release mechanism permits the tie line 54 to extend directly from the helicopter to the balloon. Another manner for connecting tie line 54 to the helicopter is illustrated in FIGURE 8, wherein the helicopter is provided with outside support rods 80 and 81 which pivotally support opposite ends of a sling cable 82. The cable passes through a rod 83 which has a length corresponding to the width of the helicopter to permit the cable and bar to swing freely relative to the helicopter. A line 84 is secured to opposite ends of the bar 83 and passes through the ring 57" which supports the quick release hook 56. The electrical leads 74 for the quick release mechanism are carried along line 84 and cable 82 to the cockpit. Also, it is apparent that other suitable tow line arrangements can be utilized. For instance, the tow line 50 and tie line 54 can be replaced by the single tow line 85, which has one end 86 connected to the nose of the balloon and the other end 87 connected to the upper surface of the balloon in approximately the same locations as the ends of tow line 50. The tow line 85 extends through ring 55 which is connected to the quick release mechanism 56 to permit the helicopter to move fore and aft and laterally relative to the balloon. The action of tow line 85 is similar to that of the tow line 50 and tie line 54, but requires substantially more line and it is understood that the tow line 85 could be utilized with any one of the suspension bars 58, 58' or 83.

The operation of the combined balloon and helicopter in lifting and transporting a load will now be described. In FIGURE 1, the load 32 is shown attached to the balloon and since the load is of slightly greater weight than the lift of the balloon, the load serves to secure the balloon. For example, the lift of the balloon could be taken as 48 tons and the weight of the load could be 50 tons. The helicopter is located on the ground near the balloon and is secured to the long tie line 54 which hangs downwardly from the tow line 50. When it is desired to transport the load 32, the helicopter will be moved into a position directly above the balloon, as illustrated by the full line position of the helicopter in FIGURE 2. In the illustration of the balloon overload given above, it is apparent that the helicopter must exert in excess of a two ton lift in order to supply, in combination with the balloon, a lift in excess of the weight of load 32.

Once the combined lift of the helicopter and balloon has moved the weight to a desired altitude, the helicopter is then placed in forward motion. During this initial forward movement of the helicopter, the ring 53 will slide along the tow line 50 until a point is reached where the angular position of the line 54 acts directly against the combined drag force and overload weight. Since the drag of the balloon will vary with flight speed, the angle assumed by tie line 54 will be a function of the flight speed. The relationship between the drag force on the balloon acting in the direction of movement of the balloon and the overload weight of the balloon acting vertically can be selected so that the tie line 54 assumes an angle such that the helicopter is ahead of the balloon by a safe distance. Also, by transmitting the towing force to the helicopter at about its center of thrust and center of gravity by the ring 60 of FIGURE 6 or the cable 62 of FIGURE 8, the pitch and roll torques transmitted to the fuselage because of the tow force will be held to a minimum in the range of towing angles assumed by tie line 54. By utilizing a universal connection with the helicopter and the tow line, the helicopter can move both fore and aft of the balloon and laterally of the balloon in order to maneuver the balloon and the load attached thereto. A suitable warning system can be utilized to prevent the helicopter from assuming positions relative to the balloon which result on excessive torques on the helicopter. Either the tie line 54 or tow line 85 will be of sufficient length to permit location of the helicopter at a great enough distance from the balloon to be free of fire and explosion hazards and to permit the pilot to observe the movement of the balloon. When the helicopter is flying ahead of the balloon, the balloon will also be free from the downwash of the helicopter.

It will be understood that while the helicopter is transporting the load, the flexible bag 40 will be empty so that no ballast weight will be carried by the balloon. After the load has been transported to its destination, the helicopter can be maneuvered relative to the balloon and the lift of the helicopter reduced in order to set the load down and the ground crew can also maneuver the balloon by use of mooring lines 46. After the load is located on the ground, the helicopter is free to land. Before detaching the load, the flexible bag 40 will be connected to the liquid tank 44 and will be supplied with liquid until the weight of liquid causes a slackening in the shroud lines at a location between the bag and the ring 28. At this time the ballast weight added to the bag has become equal to the load 32. Thereafter, the pull cord 36 can be actuated to release hook 29 in order to detach the load 32 from the shroud lines, and the balloon will remain moored by the overload weight in the flexible bag.

As illustrated in FIGURE 4, the helicopter can return the balloon and the ballast weight in bag 40 to its original loading location in order to pick up a second load. After a second load has been attached to the hook 29, the liquid within the bag 40 will be removed so that the bag will again assume its collapsed condition as illustrated in FIGURE 1. As illustrated in FIGURE 9, the flexible bag can be replaced by a standby weight 47 which can be hooked to the ring 28 by mechanism 29′ prior to releasing the load 32 and the standby weight 47 will serve the same purpose as the flexible bag 40. It is understood that under some conditions, it may be necessary to carry some ballast weight with the load in order to overload the balloon by the desired amount. If during the transportation of the balloon, hazardous conditions for the helicopter are encountered, such as adverse weather, explosion of the balloon, etc., the quick release mechanism 56 can be operated by the pilot to free the balloon and load from the helicopter so that the helicopter is quickly relieved from its attachment to the balloon.

The present invention therefore provides a method of transporting a load by attaching the load to a balloon of less lift than the weight of the load. The balloon is then towed by a helicopter which produces the additional vertical lift required to raise the load and which, in addition, produces the necessary towing force to transport the balloon and the load. This method also contemplates the addition of ballast weight to the balloon before releasing of the load so that the balloon will continually remain overloaded in the interval between the removal of one load and the attachment of another load. The present invention also provides apparatus for attaching and detaching loads from a balloon and for attaching the helicopter to the balloon for transporting the balloon and attached load. Various types of connections can be utilized to transmit the tow load to the helicopter and the relationship between the drag of the balloon and the amount of overload weight applied to the balloon during flight can be varied to obtain the best towing conditions and the best stability of the helicopter. Also, various types of quick release mechanisms can be provided for releasing the helicopter and various devices for supplying a ballast weight can be utilized. Other modifications are contemplated by those skilled in the art without departing from the spirit and scope of the invention as hereinafter defined by the appended claims.

What is claimed is:

1. The method of transporting a load with the combination of a helicopter and balloon, comprising the steps of attaching said load to a balloon having a lift less than the weight of the load so that the balloon is overweighted, positioning a tow line along the upper surface of the balloon attaching the tow line to the balloon at spaced points on the surface of the balloon, securing towing means to the helicopter, slidably connecting the towing means to the tow line, and flying the helicopter at different positions above and relative to the balloon to supply the additional lift force and tow force required to raise and transport the balloon and load.

2. The method of transporting a load with the combination of a helicopter and balloon comprising the steps of attaching the load to a balloon having a lift less than the weight of the load so that the balloon is overweighted, attaching a tow line to the balloon at spaced points on the surface of the balloon, universally attaching a towing device to the helicopter at substantially the center of thrust, and slidably connecting the tow device to the tow line to permit the helicopter to fly above the balloon and apply a force to the balloon from a plurality of different positions relative to the balloon depending on the amount of overload of the balloon and the drag of the balloon.

References Cited in the file of this patent

UNITED STATES PATENTS

| | | |
|---|---|---|
| 1,247,974 | Lendner | Nov. 27, 1917 |
| 1,563,571 | Huffman | Dec. 1, 1925 |
| 2,398,744 | Jalbert | Apr. 16, 1946 |
| 2,704,192 | Paul | Mar. 15, 1955 |
| 2,730,398 | Huested | Jan. 10, 1956 |
| 2,904,285 | Huch | Sept. 15, 1959 |

FOREIGN PATENTS

| | | |
|---|---|---|
| 748,059 | Great Britain | Apr. 18, 1956 |

OTHER REFERENCES

Modern Mechanic and Inventions, pp. 88.